United States Patent
Oh et al.

(10) Patent No.: US 7,893,584 B2
(45) Date of Patent: Feb. 22, 2011

(54) SPINDLE MOTOR

(75) Inventors: Jong Ryeol Oh, Seoul (KR); Ho Kyung Jang, Gyunggi-do (KR)

(73) Assignee: Samsung Electro-Mechanics Co., Ltd. (KR)

( * ) Notice: Subject to any disclaimer, the term of this patent is extended or adjusted under 35 U.S.C. 154(b) by 164 days.

(21) Appl. No.: 12/424,498

(22) Filed: Apr. 15, 2009

(65) Prior Publication Data

US 2010/0187927 A1    Jul. 29, 2010

(30) Foreign Application Priority Data

Jan. 28, 2009    (KR) .................. 10-2009-0006582

(51) Int. Cl.
  *H02K 5/16* (2006.01)
(52) U.S. Cl. ....................................................... 310/90
(58) Field of Classification Search .................. 310/90; 384/100
  See application file for complete search history.

(56) References Cited

U.S. PATENT DOCUMENTS 7,147,376 B2 * 12/2006 Shimizu et al. ............. 384/107
7,345,392 B2 * 3/2008 Hafen et al. .................. 310/90

FOREIGN PATENT DOCUMENTS

JP    2007-325384    * 12/2007

* cited by examiner

*Primary Examiner*—Nguyen N Hanh
(74) *Attorney, Agent, or Firm*—Blakely, Sokoloff, Taylor & Zafman, LLP

(57) ABSTRACT

Disclosed herein is a spindle motor which is capable of more easily controlling an axial gap and levelness between the thrust plate of a rotating shaft and a sealing cap. The spindle motor includes a rotating shaft having a thrust plate which is perpendicularly inserted into the upper portion of the rotating shaft. A sleeve accommodates the rotating shaft and rotatably supports the rotating shaft. The sleeve is secured to a plate. A sealing cap is secured to the sleeve through laser welding in such a way as to face the upper surface of the thrust plate. At least part of the sealing cap is stepped towards the thrust plate to correspond to a degree of deformation occurring during the laser welding.

8 Claims, 6 Drawing Sheets

SPINDLE MOTOR

CROSS REFERENCE TO RELATED APPLICATION(S)

This application claims the benefit of Korean Patent Application No. 10-2009-0006582, filed on Jan. 28, 2009, entitled "SPINDLE MOTOR", which is hereby incorporated by reference in its entirety into this application.

BACKGROUND OF THE INVENTION

1. Field of the Invention

The present invention relates generally to a spindle motor and, more particularly, to a spindle motor which is capable of more easily controlling an axial gap and levelness between the thrust plate of a rotating shaft and a sealing cap.

2. Description of the Related Art

Generally, a spindle motor maintains the rotational characteristics of high precision, because a bearing housing a rotating shaft therein rotatably supports the rotating shaft. Because of these characteristics, the spindle motor has been widely used as the drive means of hard-disk drives, optical disk drives, magnetic disk drives and other recording media requiring high-speed rotation.

In such a spindle motor, a hydrodynamic bearing is generally used to inject a predetermined fluid between a rotating shaft and a sleeve for the axial support of the rotating shaft so that the rotating shaft may easily rotate, and to generate dynamic pressure when the rotating shaft rotates.

The hydrodynamic bearing may have a dynamic pressure-generating groove so as to generate dynamic pressure of the fluid during the rotation of the rotating shaft. Such a dynamic pressure-generating groove may be formed in each of the inner circumferential part of the sleeve which rotatably supports the rotating shaft and a thrust plate which is installed perpendicular to the axial direction of the rotating shaft. One example of the conventional spindle motor is illustrated in FIG. 6.

As shown in FIG. 6, the conventional spindle motor includes a plate 10, a sleeve 20, an armature 30, a rotating shaft 40, a thrust plate 50, a hub 60 and a sealing cap 70.

The plate 10 is mounted to a device such as a hard-disk drive, and the sleeve 20 is secured to the central portion of the plate 10 through press-fitting.

The sleeve 20 rotatably accommodates the rotating shaft 40 therein, and the sealing cap 70 is secured to the upper portion of the sleeve so as to prevent the removal of the thrust plate 50 and the rotating shaft 40. Further, the sleeve 20 has hydrodynamic bearings on the inner circumference facing the rotating shaft 40 and a portion facing the thrust plate 50.

When external power is applied to the armature 30, the armature 30 forms an electric field so as to rotate the hub 60 on which an optical or magnetic disk is mounted. The armature 30 includes a core 31 which is formed by laminating a plurality of metal sheets and a coil 32 which is wound several times on the core 31.

The rotating shaft 40 axially supports the hub 60, and is inserted into the sleeve 20 to be rotatably supported by the sleeve 20. The thrust plate 50 is secured to the upper portion of the rotating shaft 40.

The thrust plate 50 is secured to the rotating shaft 40. An upper thrust bearing is provided between the thrust plate 50 and the sealing cap 70, and a lower thrust bearing is provided between the thrust plate 50 and the sleeve 20. Here, the lower thrust bearing generates fluid dynamic pressure using a fluid stored between the sleeve 20 and the thrust plate 50 during the rotation of the rotating shaft 40, thus floating the thrust plate 50 from the sleeve 20. That is, owing to the lower thrust hydrodynamic bearing, the thrust plate 50 is not in contact with the sleeve 20 during the rotation of the rotating shaft 40. Further, the upper thrust bearing generates fluid dynamic pressure using fluid between the thrust plate 50 and the sealing cap 70 during the rotation of the rotating shaft 40, so that the non-contact state between the thrust plate 50 and the sealing cap 70 is maintained.

The hub 60 mounts the optical or magnetic disk (not shown) thereon to rotate it. A magnet 61 which forms a magnetic force is secured to the inner circumference of the hub 60 in such a way as to face the armature 30.

The sealing cap 70 is secured to the sleeve 20 in such a way as to face the thrust plate 50. A fluid sealing part 71 is formed between the sealing cap 70 and the thrust plate 50 to store fluid. Further, a gap must be maintained between the sealing cap 70 and the thrust plate 50 to form the upper thrust bearing.

Meanwhile, in the conventional spindle motor having the above construction, the sealing cap 70 is welded to the sleeve 20 through laser welding or the like and a predetermined gap is maintained between the sealing cap 70 and the thrust plate 50. However, during the laser welding process for the coupling of the sealing cap 70, the sealing cap 70 may become deformed or curved due to the hardening of a weld part 80 and the residual stress applied to the sealing cap 70.

In detail, as shown in FIGS. 7 and 8, in the case where the sealing cap 70 is seated on the sleeve 20 and thereafter a junction between the sealing cap 70 and the sleeve 20 is welded using a laser welding machine or the like, as shown in FIG. 8, the inner circumference of the sealing cap 70 may be bent upwards (the direction shown by the arrow) or damaged.

That is, during the laser welding of the sealing cap 70, the gap and the levelness between the sealing cap 70 and the thrust plate 50 cannot be kept constant. Hence, it is difficult to obtain the stable drive characteristics of the spindle motor.

SUMMARY OF THE INVENTION

The present invention has been made in an effort to provide a spindle motor, in which the lower portion of a sealing cap is stepped by a distance between the sealing cap and a thrust plate which is increased by laser welding, thus maintaining a desired gap between the sealing cap and the thrust plate even after the laser welding process has been completed.

In a spindle motor according to an embodiment of the present invention, a spindle motor includes a rotating shaft having a thrust plate which is perpendicularly inserted into the upper portion of the rotating shaft. A sleeve accommodates the rotating shaft and rotatably supports the rotating shaft. The sleeve is secured to a plate. A sealing cap is secured to the sleeve through laser welding in such a way as to face the upper surface of the thrust plate. At least part of the sealing cap is stepped towards the thrust plate to correspond to a degree of deformation occurring during the laser welding.

The sealing cap includes a seating part seated on the sleeve, a stepped part extending to the thrust plate in such a way as to form a step between the stepped part and a bottom surface of the seating part, and a fluid sealing part extending from the stepped part and holding fluid therein.

The stepped part of the sealing cap is stepped in proportion to a distance between the sealing cap and the thrust plate which is increased by residual stress applied to the sealing cap during the laser welding.

Further, the stepped part is formed such that a step of 15 to 20 μm is formed between the stepped part and the seating part.

The bottom surface of the stepped part is spaced apart from the thrust plate by 30 μm after the laser welding.

The bottom surface of the stepped part is parallel to the bottom surface of the seating part.

The stepped part includes an inclined surface which is inclined to a degree corresponding to a change of angle between the sealing cap and the thrust plate due to residual stress applied to the sealing cap during the laser welding.

The inclined surface is formed in such a way as to be inclined from the seating part to the thrust plate.

BRIEF DESCRIPTION OF THE DRAWINGS

The above and other objects, features and advantages of the present invention will be more clearly understood from the following detailed description, taken in conjunction with the accompanying drawings, in which.

DESCRIPTION OF THE PREFERRED EMBODIMENTS

Hereinafter, spindle motors according to the preferred embodiments of the present invention will be described in detail with reference to the accompanying drawings.

Figure 1:
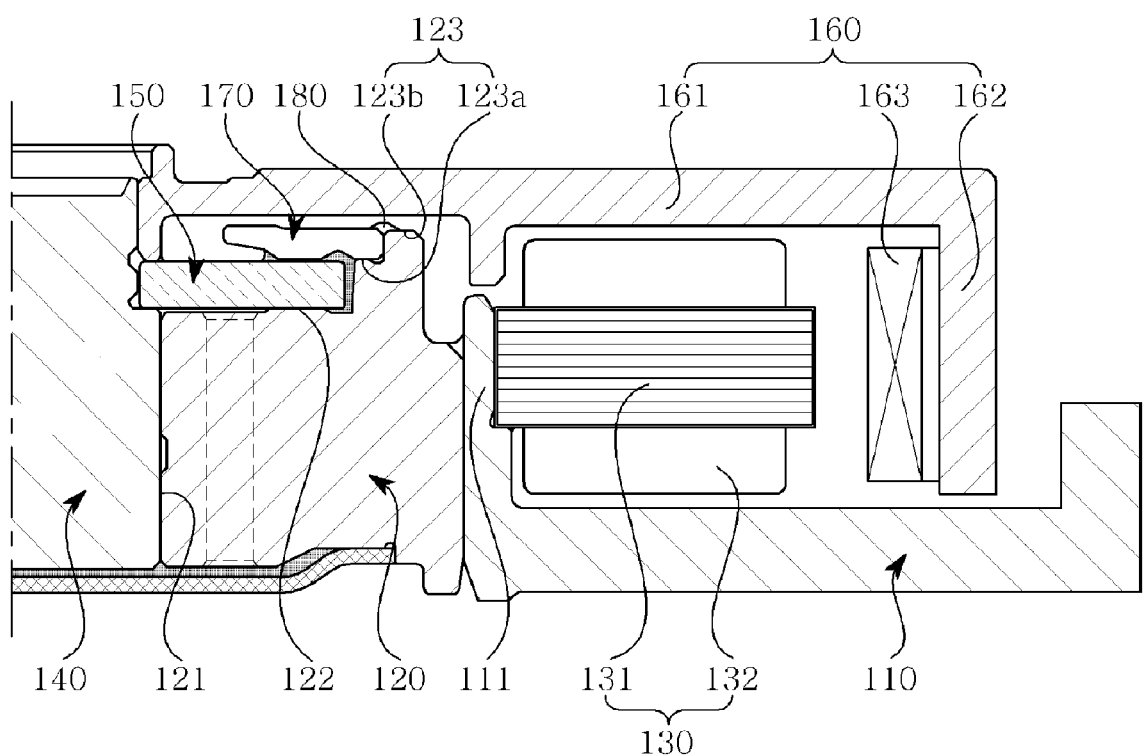
FIG. 1 is a schematic sectional view illustrating a spindle motor according to an embodiment of the present invention.

As shown in FIG. 1, a spindle motor 100 according to the preferred embodiment of the present invention includes a plate 110, a sleeve 120, an armature 130, a rotating shaft 140, a thrust plate 150, a hub 160 and a sealing cap 170.

The plate 110 functions to support the entire spindle motor 100 and is mounted to a device such as a hard disk drive to which the spindle motor 100 is to be installed. Here, the plate 110 is manufactured using a light material such as an aluminum or aluminum alloy plate. However, the plate 110 may be manufactured using a steel plate.

Further, a sleeve coupling part 111 protrudes from the plate 110, so that the sleeve 120 is coupled to the sleeve coupling part 111. The sleeve coupling part 111 has in a central portion thereof a coupling hole having a diameter which is the same as the outer diameter of the sleeve 120, so that the sleeve 120 is inserted into the central portion of the sleeve coupling part 111. That is, the sleeve 120 is inserted into the coupling hole, so that the sleeve 120 is held at a predetermined position. Here, in order to secure the sleeve 120 to the sleeve coupling part 111, an adhesion process using an additional adhesive or a laser welding process may be performed. However, the sleeve 120 may be secured to the sleeve coupling part 111 by press-fitting the sleeve 120 into the coupling hole with a predetermined pressure.

The sleeve 120 functions to rotatably support the rotating shaft 140 and has a hollow cylindrical shape, with hydrodynamic bearings provided on the inner circumferential part 121 which faces the rotating shaft 140 and a bearing surface 122 which faces the thrust plate 150. In a detailed description, a radial dynamic pressure-generating groove (not shown) is formed in the inner circumferential part 121 of the sleeve 120 to form the radial hydrodynamic bearing between the sleeve 120 and the rotating shaft 140. Fluid is stored between the inner circumferential part 121 and the rotating shaft 140. The radial dynamic pressure-generating groove generates fluid dynamic pressure using the fluid stored between the sleeve 120 and the rotating shaft 140 during the rotation of the rotating shaft 140, thus maintaining the non-contact state between the rotating shaft 140 and the sleeve 120. According to this embodiment, the radial dynamic pressure-generating groove is formed in the inner circumferential part 121 of the sleeve 120. However, the radial dynamic pressure-generating groove may be formed in the outer circumference of the rotating shaft 140.

Here, a lower thrust bearing is formed between the bearing surface 122 of the sleeve 120 and the lower surface of the thrust plate 150. The lower thrust bearing generates fluid dynamic pressure using the fluid stored between the thrust plate 150 and the bearing surface 122 of the sleeve 120, thus maintaining the non-contact state between the thrust plate 150 and the sleeve 120.

Further, the cap coupling part 123 of the sleeve 120 to which the sealing cap 170 is secured extends perpendicularly to the bearing surface 122 and forms a step.

The cap coupling part 123 extends perpendicularly to the bearing surface 122 by the height of the thrust plate 150, and includes a seating surface 123a on which the sealing cap 170 is seated, and a weld surface 123b which extends perpendicularly from the seating surface 123a by the height of the sealing cap 170 and is welded to an end of the sealing cap 170. Here, a weld part 180 is formed between the weld surface 123b and the sealing cap 170 through laser welding.

The armature 130 forms an electric field using external power applied to the armature 130 so as to rotate the hub 160 on which the optical or magnetic disk is mounted. The armature 130 includes a core 131 which is formed by laminating a plurality of metal sheets and a coil 132 which is wound several times on the core 131.

The core 131 is secured to the outer circumference of the sleeve coupling part 111 of the plate 110, and the coil 132 is wound on the core 131. Here, the coil 132 forms an electric field using an external current applied to the coil 132, thus rotating the hub 160 using electromagnetic force generated between the coil 132 and the magnet 163 of the hub 160.

The rotating shaft 140 functions to axially support the hub 160. The rotating shaft 140 is inserted into and rotatably supported by the sleeve 120. Meanwhile, the thrust plate 150 is secured to the upper portion of the rotating shaft 140. Here, in order to secure the thrust plate 150 inserted into the upper portion of the rotating shaft 140 to the rotating shaft 140, an additional laser welding process may be performed. However, by applying a predetermined pressure to the thrust plate 150, the thrust plate 150 may be press-fitted into the rotating shaft 140.

The thrust plate 150 is secured to the rotating shaft 140. An upper thrust bearing is formed between the thrust plate 150 and the sealing cap 170, and a lower thrust bearing is formed between the thrust plate 150 and the bearing surface 122 of the sleeve 120. Upper and lower thrust dynamic pressure-generating grooves (not shown) are formed in a portion of the thrust plate 150 facing the sealing cap 170 and a portion of the thrust plate 150 facing the sleeve 120, respectively. The lower thrust dynamic pressure-generating groove generates fluid dynamic pressure using fluid stored between the sleeve 120 and the thrust plate 150 during the rotation of the rotating shaft 140, thus floating the thrust plate 150 from the bearing surface 122 of the sleeve 120 by a predetermined height.

Further, the upper thrust dynamic pressure-generating groove generates fluid dynamic pressure using fluid stored between the sealing cap 170 and the thrust plate 150 during the rotation of the rotating shaft 140, thus generating a force pushing the thrust plate 150 from the sealing cap 170. That is, by the upper and lower thrust hydrodynamic bearings, the thrust plate 150 is not in contact with the sealing cap 170 and the sleeve 120 during the rotation of the rotating shaft 140. According to this embodiment, the thrust dynamic pressure-generating grooves are formed in the thrust plate 150. However, the thrust dynamic pressure-generating grooves may be formed in the bearing surface 122 of the sleeve 120 and the sealing cap 170.

The hub 160 mounts the optical or magnetic disk thereon to rotate it. The hub 160 includes a disk part 161 to which the rotating shaft 140 is secured, and an annular edge part 162 which extends from an end of the disk part 161.

The rotating shaft 140 is inserted into the central portion of the disk part 161, and the edge part 162 extends axially along the rotating shaft 140 in such a way that the inner circumferential surface of the edge part 162 faces the armature 130. The magnet 163 is attached to the inner circumference of the edge part 162 and forms a magnetic field so as to generate an electromagnetic force in cooperation with the electric field formed by the coil 132.

The sealing cap 170 functions to support the thrust plate 150, thus preventing the removal of the hub 160 and the rotating shaft 140. After the sealing cap 170 is seated on the seating surface 123a of the cap coupling part 123 of the sleeve 120 in such a way as to face the upper surface of the thrust plate 150, the sealing cap 170 is secured to the sleeve 120 through laser welding.

Figure 2:
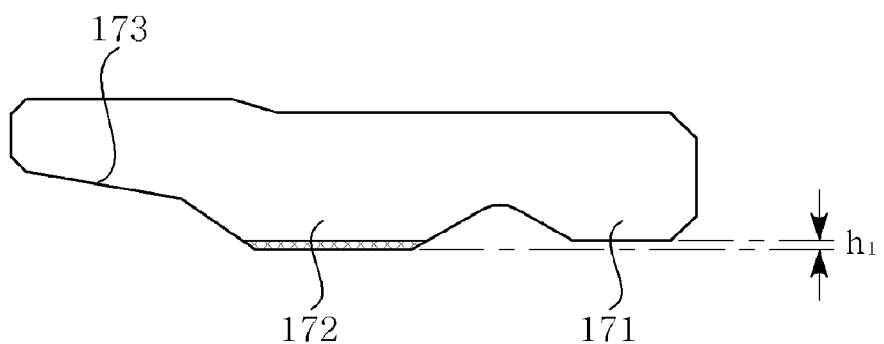
FIG. 2 is a schematic sectional view illustrating a sealing cap included in the spindle motor of FIG. 1.

Here, the sealing cap 170 has the shape of an annular disk. As shown in FIG. 2, the sealing cap 170 includes a seating part 171 which is seated on the seating surface 123a of the cap coupling part 123, a stepped part 172 which extends from the seating part 171 to the thrust plate 150 in such a way as to form a step, and a fluid sealing part 173 which extends from the stepped part 172 in such a way as to be tapered.

As shown in FIG. 2, the bottom surface of the seating part 171 and the bottom surface of the stepped part 172 are stepped such that they have a difference in height $h_1$. Here, the height $h_1$ corresponds to the upward deformation of the sealing cap 170 by residual stress during the mounting of the sealing cap 170 through laser welding. That is, after the degree of deformation caused by the laser welding is calculated, the height $h_1$ is determined. Thus, even if the sealing cap 170 is deformed by the laser welding, a constant gap can be maintained between the bottom surface of the stepped part 172 and the thrust plate 150.

Figure 3:
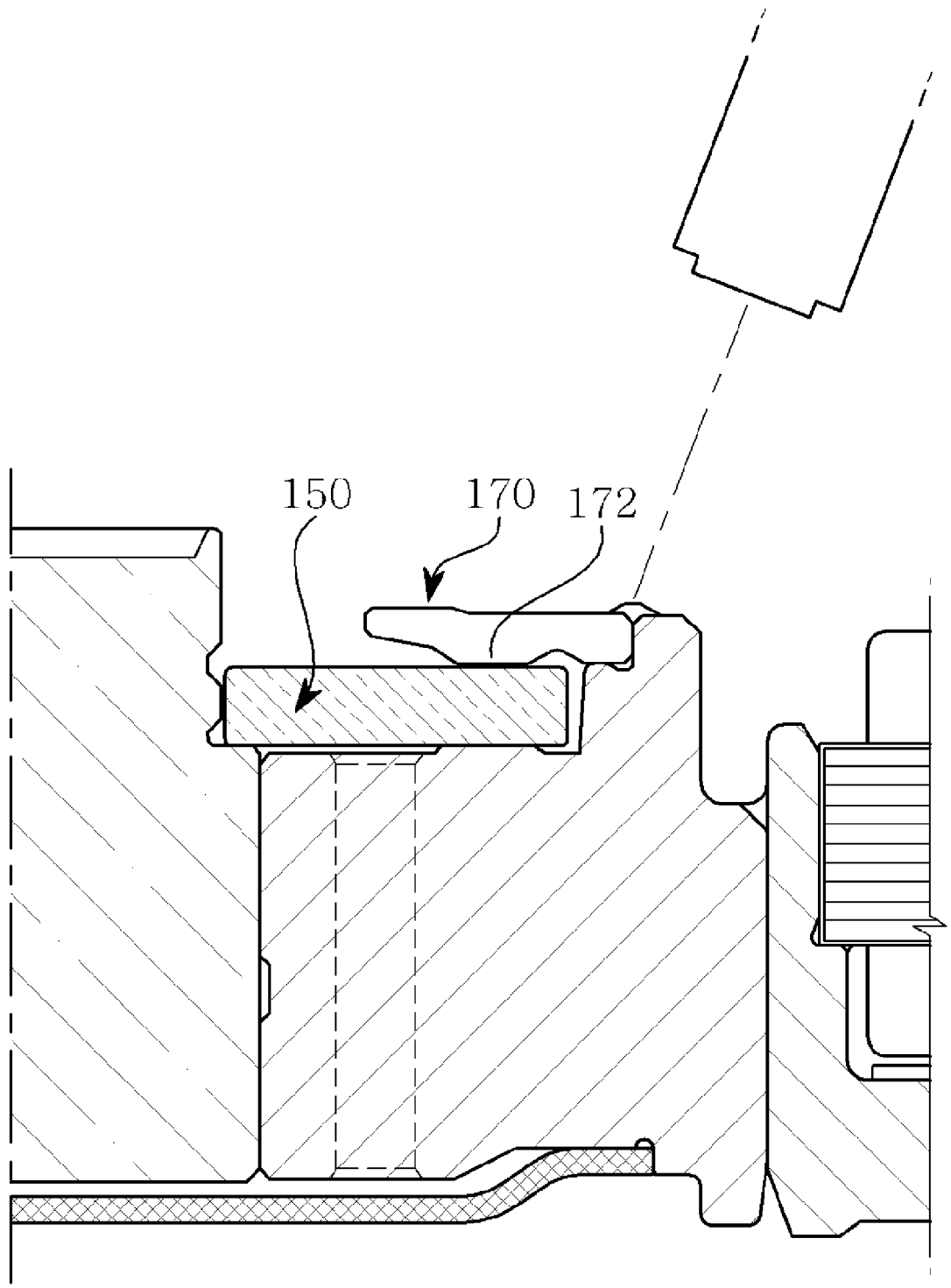
FIGS. 3 and 4 are schematic views illustrating the laser welding for the sealing cap of FIG. 1.
Figure 4:
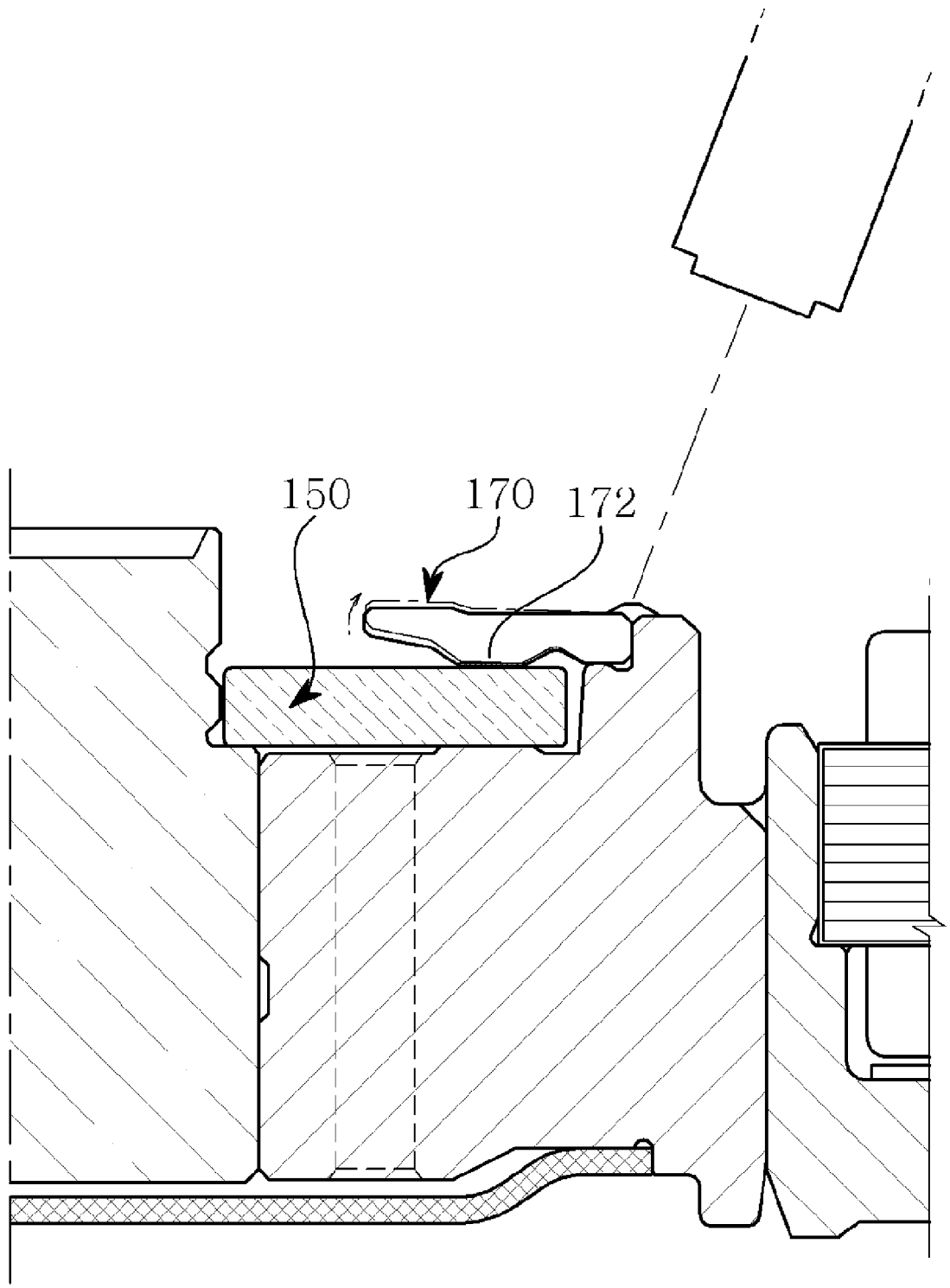

That is, as shown in FIGS. 3 and 4, even if the sealing cap 170 becomes deformed in the arrow direction during the laser welding for mounting the sealing cap 170, the stepped part 172 extends to the thrust plate 150 to form a step in accordance with the degree of deformation. Thus, a constant gap can be maintained for fluid dynamic pressure between the stepped part 172 and the thrust plate 150.

For example, in order to stably drive the spindle motor 100 even at a low temperature, the gap of about 30 μm must be maintained between the sealing cap 170 and the thrust plate 150. But, considering that the sealing cap 170 is deformed upwards by about 15 to 20 μm during the laser welding of the sealing cap 170, the height $h_1$ of the stepped part 172 is determined to be 15 to 20 μm, so that a proper gap can be maintained between the sealing cap 170 and the thrust plate 150.

Figure 5:
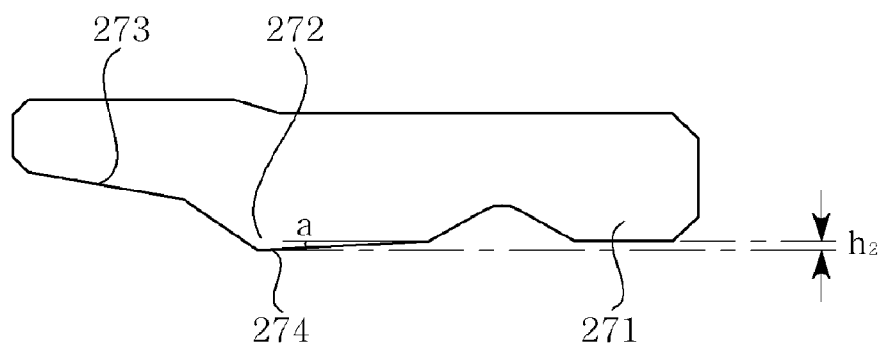
FIG. 5 is a schematic sectional view illustrating a sealing cap according to another embodiment of the present invention.
Figure 6:
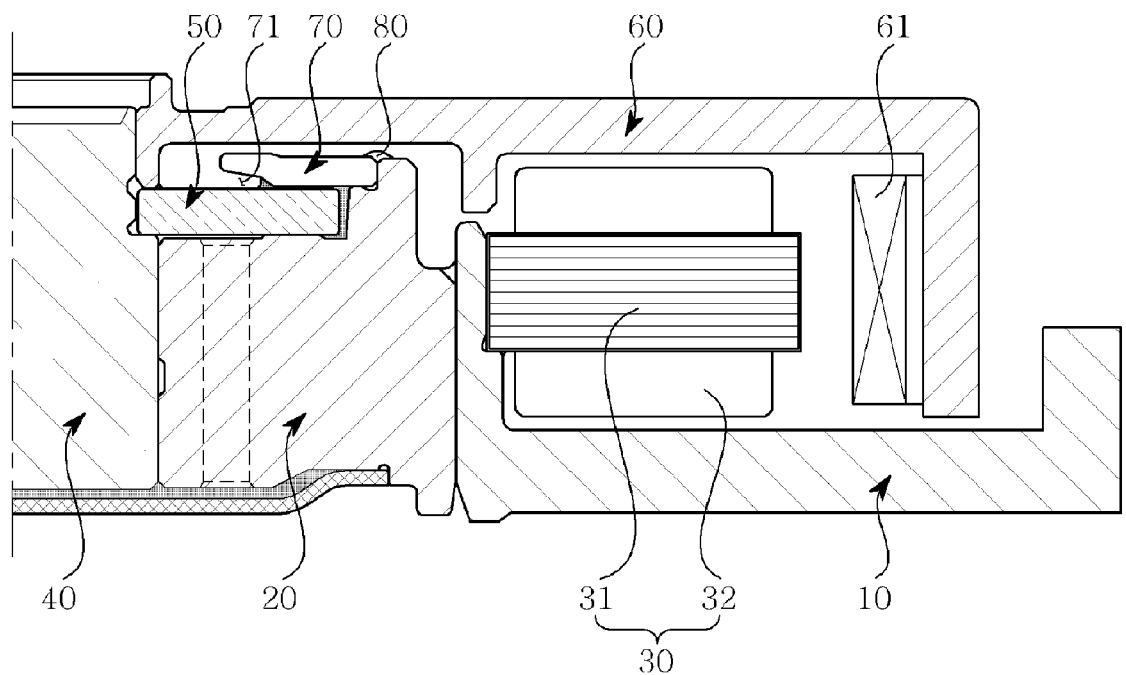
FIG. 6 is a schematic sectional view illustrating a conventional spindle motor.
Figure 7:
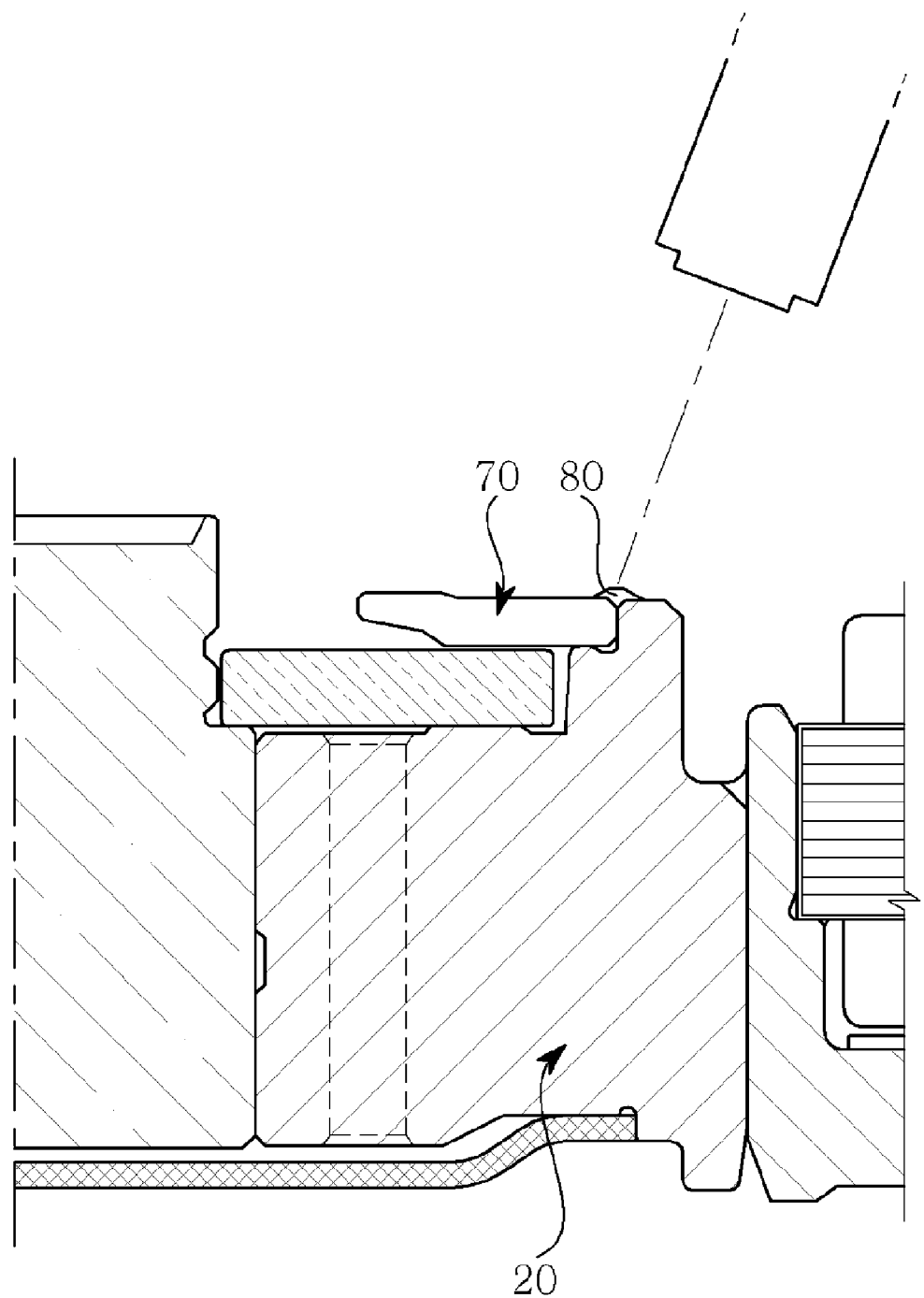
FIGS. 7 and 8 are schematic views illustrating the laser welding for a conventional sealing cap.
Figure 8:
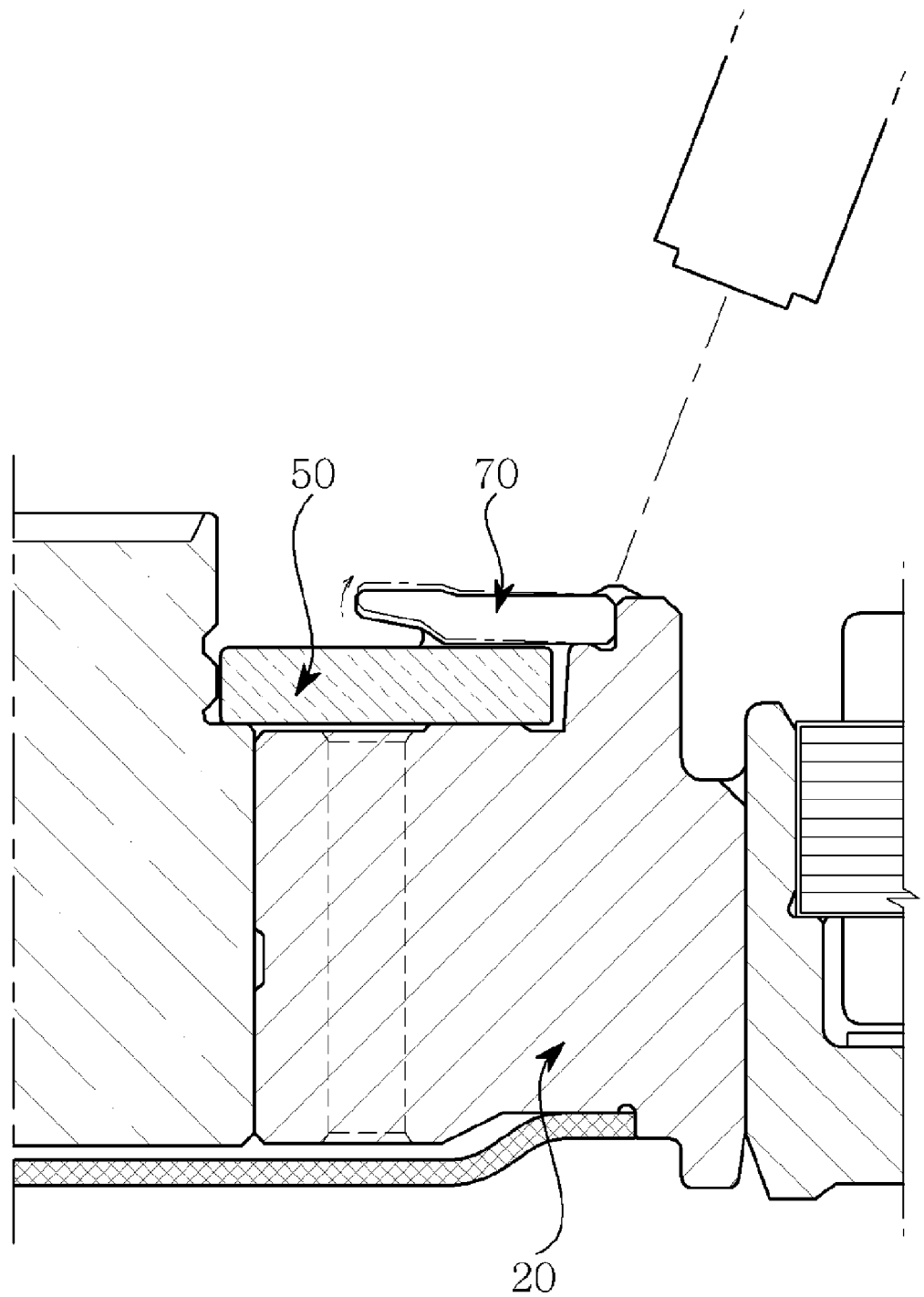

FIG. 5 illustrates a sealing cap 270 according to another embodiment of the present invention. The sealing cap 270 according to another embodiment of the present invention has the shape of an annular disk. The sealing cap 270 includes a seating part 271 which is seated on the seating surface 123a of the cap coupling part 123, a stepped part 272 which extends from the seating part 271 to the thrust plate 150 in such a way as to form a step, a fluid sealing part 273 which extends from the stepped part 272 in such a way as to be tapered, and an inclined surface 274 which is formed on the stepped part 272 in such a way as to face the thrust plate 150.

As shown in FIG. 5, the seating part 271 and the stepped part 272 are stepped such that they have a difference in height h2. Here, the height $h_2$ corresponds to the upward deformation of the sealing cap 270 by residual stress during the mounting of the sealing cap 270 through laser welding. That is, after the degree of deformation caused by the laser welding is calculated, the height $h_2$ is determined. Thus, even if the sealing cap 270 is deformed by the laser welding, a constant gap can be maintained between the inclined surface 274 of the stepped part 272 and the thrust plate 250.

For example, in order to stably drive the spindle motor 100 even at a low temperature, the gap of about 30 μm must be maintained between the sealing cap 270 and the thrust plate 150. But, considering that the sealing cap 270 is deformed upwards by about 15 to 20 μm during the laser welding of the sealing cap 270, the height $h_2$ of the stepped part 272 is determined to be 15 to 20 μm, so that a proper gap can be maintained between the sealing cap 270 and the thrust plate 150.

Further, the inclined surface 274 is inclined towards the thrust plate 150 while an angle a is formed between the inclined surface 274 and the seating part 271. Here, the angle a may correspond to the degree of bending of the sealing cap 270 during laser welding. That is, after the degree of bending through laser welding is calculated, the angle a is determined. Therefore, even if the sealing cap 270 is deformed or curved through laser welding, constant levelness can be maintained between the sealing cap 270 and the thrust plate 150.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

As described above, the present invention provides a spindle motor, in which the stepped part of a sealing cap extends towards a thrust plate by a distance corresponding to a degree of deformation occurring during laser welding, thus maintaining a constant gap between the sealing cap and the thrust plate even after the laser welding of the sealing cap. Further, the bottom surface of the stepped part is inclined by the degree of deformation resulting from the laser welding, thus maintaining a constant gap between the sealing cap and the thrust plate and providing excellent levelness.

What is claimed is:

1. A spindle motor, comprising:
   a rotating shaft having a thrust plate which is perpendicularly inserted into an upper portion of the rotating shaft;
   a sleeve accommodating the rotating shaft and rotatably supporting the rotating shaft;
   a plate to which the sleeve is secured; and
   a sealing cap secured to the sleeve through laser welding in such a way as to face an upper surface of the thrust plate, at least part of the sealing cap being stepped towards the thrust plate to correspond to a degree of deformation occurring during the laser welding.

2. The spindle motor as set forth in claim 1, wherein the sealing cap comprises:

a seating part seated on the sleeve;

a stepped part extending to the thrust plate in such a way as to form a step between the stepped part and a bottom surface of the seating part; and a fluid sealing part extending from the stepped part and holding fluid therein.

3. The spindle motor as set forth in claim 2, wherein the stepped part of the sealing cap is stepped in proportion to a distance between the sealing cap and the thrust plate which is increased by residual stress applied to the sealing cap during the laser welding.

4. The spindle motor as set forth in claim 3, wherein the stepped part is formed such that a step of 15 to 20 μm is formed between the stepped part and the seating part.

5. The spindle motor as set forth in claim 4, wherein a bottom surface of the stepped part is spaced apart from the thrust plate by 30 μm after the laser welding.

6. The spindle motor as set forth in claim 5, wherein the bottom surface of the stepped part is parallel to the bottom surface of the seating part.

7. The spindle motor as set forth in claim 5, wherein the stepped part comprises an inclined surface which is inclined to a degree corresponding to a change of angle between the sealing cap and the thrust plate due to residual stress applied to the sealing cap during the laser welding.

8. The spindle motor as set forth in claim 7, wherein the inclined surface is formed in such a way as to be inclined from the seating part to the thrust plate.

* * * * *